Dec. 14, 1926.
J. E. NASH
1,610,307
APPARATUS FOR SALT PURIFICATION
Original Filed August 16, 1924
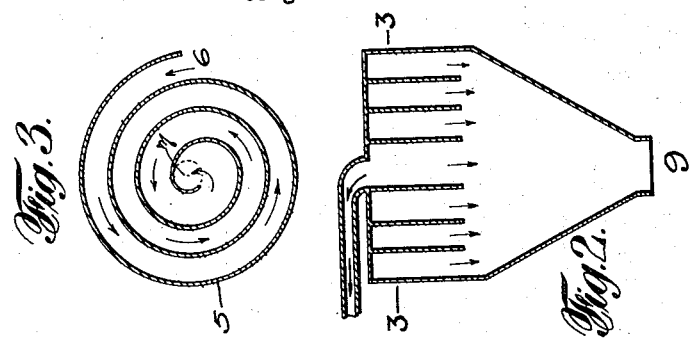
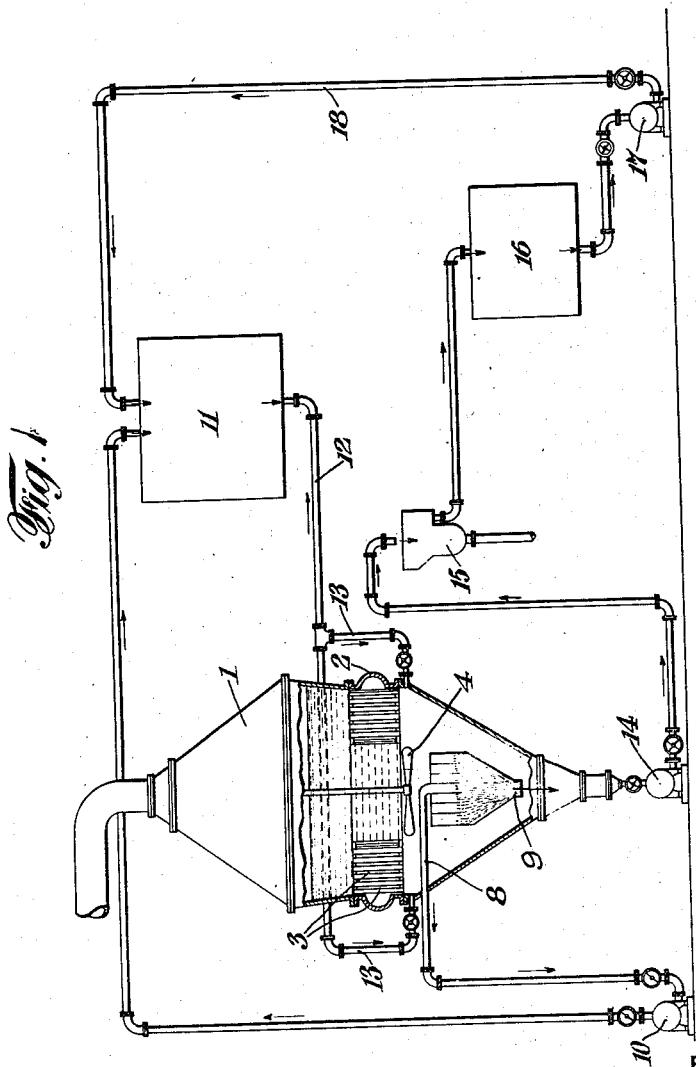
INVENTOR
James E. Nash
BY
Prindle, Wright, Neal & Bean
ATTORNEYS Patented Dec. 14, 1926.

1,610,307

UNITED STATES PATENT OFFICE.

JAMES E. NASH, OF SILVER SPRINGS, NEW YORK, ASSIGNOR TO WORCESTER SALT COMPANY, OF NEW YORK, N. Y., A CORPORATION OF NEW YORK.

APPARATUS FOR SALT PURIFICATION.

Original application filed August 16, 1924, Serial No. 732,364. Divided and this application filed February 17, 1925. Serial No. 9,740.

This invention relates to apparatus for salt purification, and more particularly to a form of evaporating pan for crystallizing salt from brines, provided with means for removal of gypsum.

This application is a division of my original application Serial Number 732,364, filed August 16, 1924, and it particularly covers the apparatus as described in my original application.

In the manufacture of salt from brines containing gypsum or calcium sulphate, one of the chief difficulties encountered has been the deposition or precipitation of the calcium sulphate with the salt desired to be obtained. Calcium sulphate is relatively more insoluble in water than common salt and hence tends to separate out very easily, so that unless some means are provided for its removal, it would unavoidably deposit with the salt as an impurity therein. This difficulty is enhanced by the relatively large percentage of calcium sulphate frequently found in brines.

It has been found that if the brine is evaporated in an evaporating pan or similar device, the fine particles of precipitated gypsum form in that part of the pan where the evaporation takes place. Due to the fact that the gypsum is in a very light, fluffy form it is retained in the circulation in the heating zone of the pan and floats on the surface of the brine until a large quantity accumulates, whereupon it has a tendency to precipitate or deposit rapidly in the form of a shower. This results, of course, in the production of not only an impure salt, but a very uneven grade or quality thereof, particularly when these showers are violent.

The prevention of the deposition of the gypsum in this manner is the chief object of this invention. A further object is to provide an apparatus including an evaporating pan or the like, in which the brines may be evaporated and in which means are provided for preventing such rapid depositions or showers of gypsum.

Accordingly, in the accompanying drawings which form a part of this specification, I have shown an embodiment of my invention which is well adapted for accomplishing the above-described objects.

In the drawings,—

Fig. 1 represents an elevation, partly in section, of an evaporating pan and associated apparatus for crystallizing salt from brine and removing the gypsum and impurities;

Fig. 2 represents a section of the separator used in the evaporating pan; and

Fig. 3 represents a section on the line 3—3 of Fig. 2.

In said apparatus there is shown an evaporating pan 1 provided with a heating means 2 around its periphery or sides so that the brine may be heated at the sides of the pan and may be caused to circulate upwardly near the surface of the liquid and thence downwardly in the center of the pan. The heating means, which may be of annular form, is perforated with a number of vertical pipes 3 which are fixed therein and through which the brine may circulate. An impeller 4 is provided for assisting in maintaining the current of brine downwardly in the center of the pan and upwardly at the sides through the heating pipes.

Beneath said impeller is a separator 5 which in this embodiment is of a circular type, having an opening 6 leading to a continuous circular passage terminating at 7 in an upwardly leading conduit 8. The separator 5 is open at the bottom, at 9, to permit the salt to deposit in the bottom of the pan 1 so that it can be removed. A pump 10 serves to elevate the liquid coming from the separator to a filter chamber 11, and a pipe 12 delivers the filtered liquid back to the pan by means of branch pipes 13 which empty just below the heating means 2. The separator may also be positioned outside of the pan, with a circular entrance pipe inside of the pan to induce a flow of brine therethrough.

As described in my previous application, Serial No. 669,465, entitled Salt manufacture, to which application specific reference is herein made, means are provided for removing the salt and entrained brine from the evaporating pan separating the salt from the brine, subjecting it to purification steps, and then returning it back to the pan. Such means comprise a pump 14 for pumping out the precipitated salt and delivering it to a separator 15 which may be of the type shown in said application and which may comprise a receptacle for receiving the brine and a partition wall over which the liquid and impurities flow. A chemical tank 16 may also be provided for suitable chemical treatment. The liquid thus purified in 16 is pumped by means of a pump 17 and conduit 18 back to the filter chamber 11 whence it is returned to the evaporating pan.

In the operation of this form of apparatus the evaporating pan is charged with brine and the latter is heated to induce evaporation and cause the salt to crystallize out. During the evaporation the circulation of the brine takes place as shown by the arrows and the impeller blades assist in this circulation by forcing the brine upwardly through the heating means at the sides or periphery of the evaporator. In the event that the precipitated gypsum accumulates and causes a shower to take place, the strong current of brine passing into the separator will carry the gypsum with it and cause it to pass through the circular passages of the separator. During its progress therein the salt will gradually deposit in the lower portion of the separator and thence pass out to the bottom of the evaporating pan, while the particles of the gypsum will be carried on, due to the strength of the current and will find their way into the conduit 8 and thence to the filter 11 where they will be removed. The filtered liquid goes back to the pan 1, as shown, to receive further treatment. In this manner only pure salt is obtained at the bottom of the pan and may be removed by pumping it out by means of the pump 14. The separator 15 will operate to remove any remaining particles of gypsum.

The process as thus carried out solves the hitherto existing difficulty in regard to the showers of gypsum, as it provides a constantly operating means for rapidly separating the precipitated contents of the evaporating pan so that very little, if any, of the impurities and gypsum will find their way to the bottom and mingle with the salt which by reason of its greater density deposits there first.

It will be found desirable to have more than one filter in order to always have one filter available for operation while the other is being cleaned.

It is, therefore, apparent that this form of apparatus and the method of carrying out operations therein are well adapted for the manufacture of salt of a high grade of purity, and that not only may the deposition of impurities and gypsum of the salt be prevented in the evaporating pan itself, but also the operation of the latter maintains a more uniform grade of salt, while the constant return of the liquid to the pan at the heating zone increases the dilution at that point and tends to prevent the occurrence of any showers of gypsum.

As many apparently widely different embodiments of this invention may be made without departing from the spirit thereof, it is understood that I do not intend to limit myself to the specific embodiment above described, except as indicated in the appended claims.

I claim:

1. An evaporating pan having a heating means at its sides provided with conduits for the passage of liquid therethrough, a separator having a discharge port at its bottom and a conduit at its top leading to a filter, a filter, and a conduit therefrom to convey filtered liquid back to said pan.

2. An evaporating pan having a heating means at its sides provided with conduits for the passage of liquid therethrough, an impeller in the central part of the pan to cause a downward movement of liquid and a circulation through said conduits, a separator below the impeller having a discharge port at its bottom and a conduit at its top leading to a filter, a filter chamber and a conduit therefrom to convey the filtered liquid back to the pan.

3. An evaporating pan provided with a heating jacket, a separator within said pan having a discharge port at its bottom and a conduit at its top for conveying away brine containing impurities, and means for causing circulation of brine through said separator.

4. An evaporating pan provided with a heating jacket, a separator within said pan having a discharge port at its bottom delivering to the discharge port of the pan, and a conduit at its top for conveying away brine containing impurities, and means for causing circulation of brine through said separator.

5. An evaporating pan provided with a heating chamber, a separator positioned below said chamber having a continuous circular passage leading to the center of the separator, a conduit leading therefrom to conduct away brine and impurities, the bottom of the separator being open to allow salt to deposit in the bottom of the pan, and means for causing a circulation of brine through the separator.

6. An evaporating pan having an annular heating chamber provided with conduits for the passage of liquid therethrough, an impeller positioned in the central part of the pan to cause a downward movement of liquid and a circulation through the said conduits, a spiral separator beneath the impeller having a discharge port at its bottom and a conduit at its top for withdrawing liquid and returning it at another point to said pan.

7. An evaporating pan having a heating chamber around its periphery provided with conduits for the passage of liquid therethrough, a separator positioned to receive liquid from the central part of the pan, a conduit from the top of the separator for withdrawing liquid therefrom and returning it to another point in the pan, and a discharge port in the bottom of the separator for delivering liquid to the exit pipe of the pan.

8. An evaporating pan having a heating chamber around its periphery provided with conduits for the passage of liquid therethrough, means for causing a circulation of liquid through said conduits, a separator positioned to receive liquid from the central part of the pan, a conduit from the top of the separator for withdrawing liquid therefrom and returning it to another point in the pan, and a discharge port in the bottom of the separator for delivering liquid to the exit pipe of the pan.

In testimony that I claim the foregoing, I have hereunto set my hand this 26 day of January, 1925.

JAMES E. NASH.